May 16, 1961  H. W. MILLER  2,984,290
SEAT CONSTRUCTION FOR TRACTORS AND LIKE VEHICLES
Filed Oct. 3, 1958  3 Sheets-Sheet 1
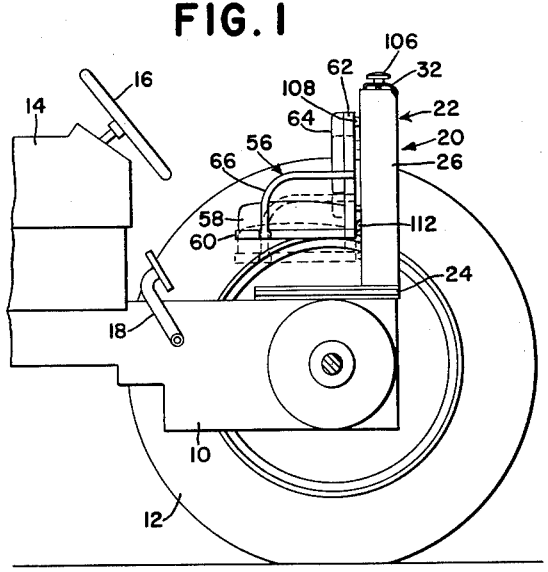
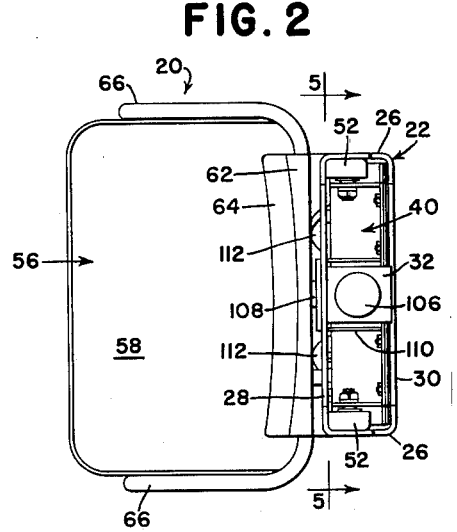
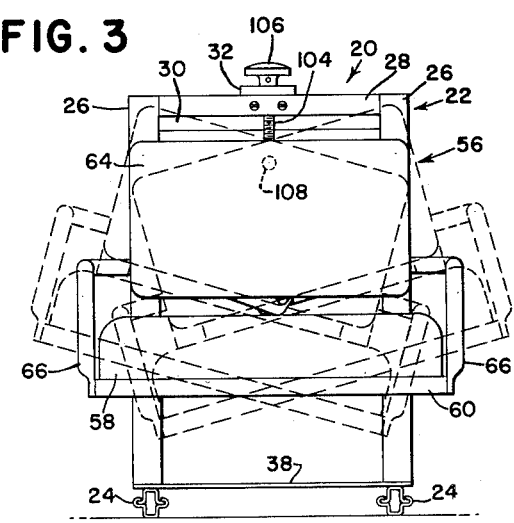
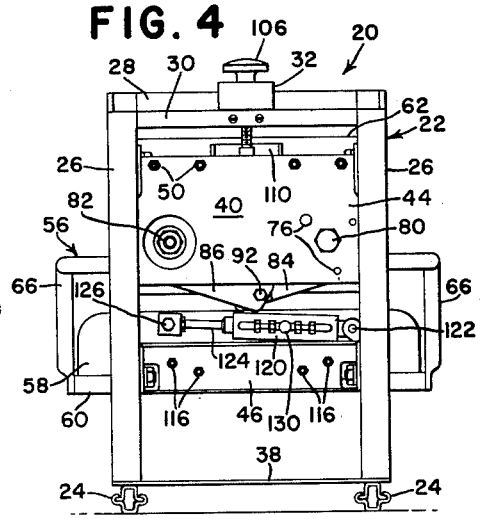
*INVENTOR.*
H. W. MILLER
BY
ATTORNEY

May 16, 1961 H. W. MILLER 2,984,290
SEAT CONSTRUCTION FOR TRACTORS AND LIKE VEHICLES
Filed Oct. 3, 1958 3 Sheets-Sheet 2
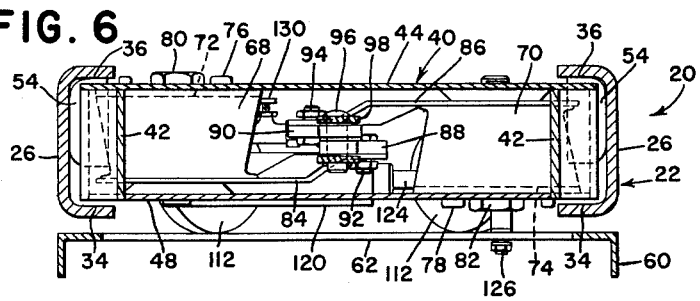
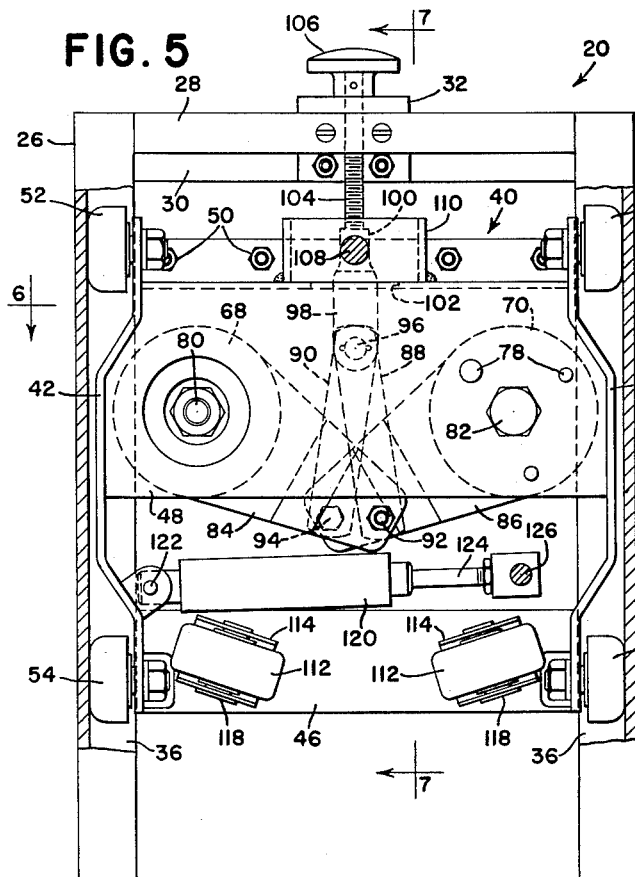
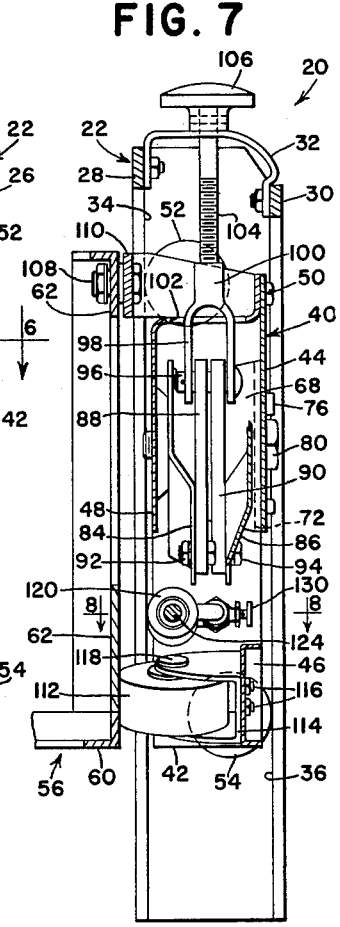
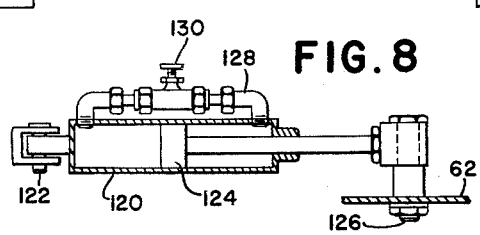
*INVENTOR.*
H. W. MILLER

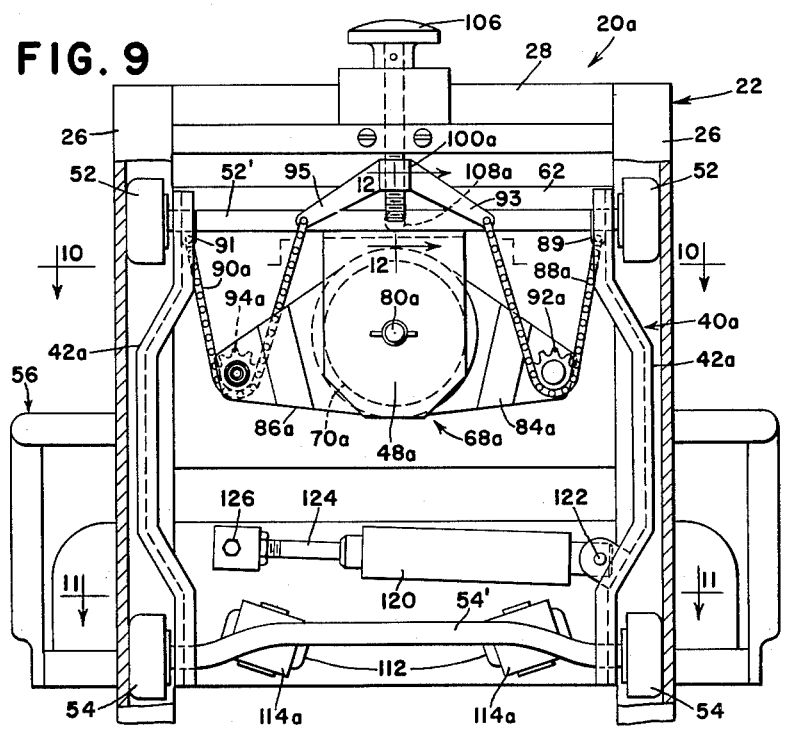
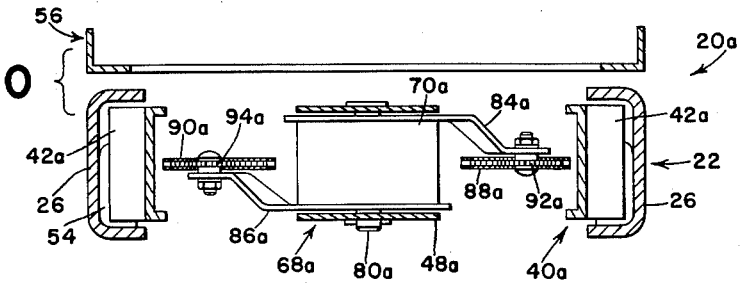
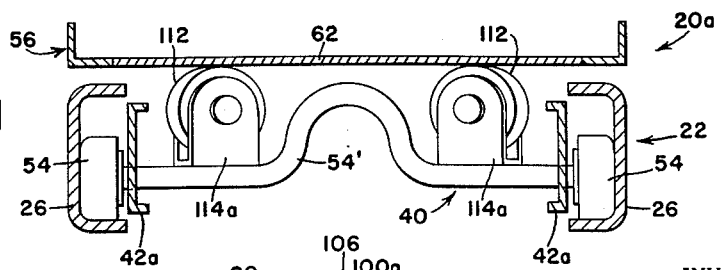
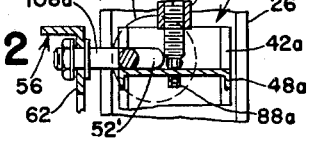
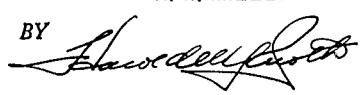

United States Patent Office 2,984,290
Patented May 16, 1961

2,984,290

SEAT CONSTRUCTION FOR TRACTORS AND LIKE VEHICLES

Hercheal W. Miller, Davenport, Iowa, assignor to Sears Mfg. Co., Davenport, Iowa, a corporation of Iowa Filed Oct. 3, 1958, Ser. No. 765,224

24 Claims. (Cl. 155—9)

This invention relates to a seat structure for agricultural vehicles such as tractors and the like in which the problems facing the seat designer are quite different from and largely more complex than those encountered by the designer of seats for automotive vehicles, for the home, etc. More particularly the invention relates to a seat and suspension in which the structure includes provision for automatic levelling of the seat, as when the tractor or other vehicle operates on a lateral slope, such as a side hill or when one rear wheel of the tractor is running in a furrow as when plowing.

It is an object of the invention to provide an overall improved seat suspension which is of a novel and compact nature in that it removes the suspension mechanism from entirely below the seat itself and thus allows a lower and more desirable seat location, besides affording additional space for vertical movement of the seat as well as simplifying not only the mounting of the seat on the tractor or the like but also the servicing, adjustment and maintenances of the suspension mechanism.

A further but nonetheless significant object is the provision of a combined suspension and leveling system in which the seat, in addition to being resiliently supported for cushioned vertical movement as rough terrain is encountered, is also supported as a pendulum swingable laterally about a relatively high fore-and-aft pivot axis for automatic leveling. Other important objects reside in means for regulating the rate of lateral swinging of the seat, including provision for securing the seat in any laterally adjusted position; a generally enclosed suspension mechanism; means for easily adjusting the suspension mechanism to provide softer or stiffer rides as desired; novel track and guide means for stabilizing vertical movement of the seat; improved means for supporting and guiding the seat during lateral swinging; and in general an improved seat and suspension therefor augmenting the aforesaid objects and features and including other features and objects as will appear from the ensuing description of preferred embodiments of the invention, by way of example, taken in conjunction with the accompanying sheets of drawing, the several figures of which are described immediately below.

Figure 1 is a reduced-scale side elevation of a rear portion of a tractor, with its near wheel removed, embodying a typical installation of the inventive seat structure.

Figure 2 is a slightly enlarged plan view of the seat structure.

Figure 3 is a front view, on the scale of Figure 2, with representative lateral positions of the seat shown in broken lines.

Figure 4 is a rear view on the scale of Figures 2 and 3.

Figure 5 is an enlarged section on the line 5—5 of Figure 2.

Figure 6 is a section on the line 6—6 of Figure 5.

Figure 7 is a section on the line 7—7 of Figure 5.

Figure 8 is a section on the line 8—8 of Figure 7.

Figure 9 is a rear elevation of a seat structure having a modified form of suspension.

Figure 10 is a section on the line 10—10 of Fig. 9.

Figure 11 is a section on the line 11—11 of Fig. 9.

Figure 12 is a section on the line 12—12 of Fig. 9.

The vehicular environment chosen for purposes of illustration is a typical agricultural tractor; although, it will be appreciated that similar problems are encountered in other agricultural vehicles, such as combines, self-propelled windrowers, etc. and in certain earth-working machinery and the like. Further, in depicting the seat structure with a tractor, its more or less conventional relationship to other parts of the tractor will be dealt with, such as its location at the rear of the tractor, etc. Hence, such expressions as "front," "rear," etc., here as well as in the claims, should be taken as illustrative and not limiting.

The tractor is shown to such extent as to reveal that it has a fore-and-aft body 10 carried on rear traction wheels, only one of which appears at 12. A forward engine hood and fuel tank structure appears at 14 and a steering wheel is shown at 16. This represents one of the several controls on the tractor, convenience of operation of which is augmented by a seat structure of proper type, construction and location. A pedal 18 represents a typical location of a clutch or brake control. The seat structure is designated in its entirety by the numeral 20.

The seat structure comprises base means in the form of an upright transverse frame element or support means 22 having lower means such as laterally spaced apart fore-and-aft tracks 24 providing for affixation to the tractor body. These may be of any suitable construction such as those ordinarily affording fore-and-aft adjustment of the seat as a whole relative to the steering wheel etc., and as such form no part of the present invention. The support frame further includes a pair of laterally spaced apart upright channels or track elements 26, rigidly secured to and rising from the movable parts of the lower means 24 to coterminous upper ends which are spanned and cross-connected by cross means made up of front and rear bars 28 and 30, and these are centrally cross-connected by a strap 32, the whole of which affords a top for the support. This gives the support a box-like structural effect, and the channels face inwardly toward each other, each channel having an inner upright front track surface 34 and a parallel inner rear surface 36. Suitable lower members, one of which is shown at 38, may be used to add rigidly to the frame or support means 22. In a preferred construction, uniting of the parts by welding is employed except as to removable or adjustable components. Aside from the fore-and-aft elongation of the lower means 24, the support means 22 is of relatively narrow fore-and-aft dimension, which is a significant aspect of its feature of compactness as well as of its capacity to carry and generally house a box-like carriage 40.

The box-like structure of the carriage is effected by opposite upright sides 42 respectively proximate to the channels 26 and transverse upright front and rear wall means, the latter of which includes co-planar upper and lower support walls or portions 44 and 46 and the former of which may comprise a single front wall 48. The wall portions 44, 46 and 48 span the sides 42 of the carriage and are preferably welded thereto to afford a space therebetween, in addition to which the wall portion 48 is bent rearwardly and flanged for connection by bolts 50 to the upper marginal edge of the rear wall portion 44. This gives the carriage a rigid unit construction and further affords a fore-and-aft dimension thereof within that of the support 22. In short, the carriage is generally contained within the support.

Guiding and stabilizing of the carriage for vertical movement relative to the support is achieved by means including a pair of upper rollers or track followers 52 and a pair of lower rollers or followers 54 received respectively in the channels 26. Each upper roller is arranged so that it bears against and runs along only the front track surface 34 of the respective channel and each rear roller is arranged so that it bears against and runs along only the rear surface 36 of its channel (Figure 7). As will be clear subsequently, the load on the carriage as the result of a rider carried on a carriage-mounted seat 56 creates a forward and downward moment which is thus resisted by the roller arrangement while minimizing friction.

The seat includes a seat cushion 58, a horizontal frame 60 for supporting the cushion, an upright transverse rear wall or back 62, a back cushion 64, and appropriate arm rests 66.

The seat itself may be of any construction, but significant here is its relatively low relation to the support 22, especially as respects the rider level afforded by the cushion 58. Also significant is the close proximity of the seat back wall 62 to the front wall means of the support carriage. This arrangement enables proper location of the seat relative to the steering wheel 16, pedal 18 and other controls, especially where a low location is desired, because, as will be brought out below, the suspension and control of the seat for vertical as well as lateral swinging or leveling is accomplished by means contained generally wholly within the box-like support 22 and carriage 40. Such design eliminates the need for locating the suspension beneath the seat as is typical of prior structures.

The suspension means for the seat, or the mounting thereof on and with the carriage for vertical movement of the two in unison, comprises resilient means, here in the form of a pair of torsion devices 68 and 70, preferably rubber blocks of truncated conical shape located between the front and rear walls of the carriage, with one at either side of the median or fore-and-aft central plane of the carriage. These blocks respectively have circular metal plates 72 and 74 bonded thereto and pinned as at 76 and 78 respectively to the front and rear carriage walls, it being clear that the blocks are reversed as to each other. Fore-and-aft mounting pins 80 and 82 serve, respectively, to aid in mounting the blocks between the carriage walls and serve also to mount first and second arms 84 and 86. Each arm is preferably steel and is bonded to the face of the block opposite to bonding of the block to its plate 72 or 74 that is pinned to the associated carriage wall, so that each block yieldingly resists turning of its arm about the fore-and-aft axis of its respective pin 80 or 82. It should be noted here that each block construction per se is known, but there is novelty in the arrangement of same in the box-like carriage 40 and further in the relationship of the arms to each other as inwardly extending members that intersect but operate in separate transverse upright planes (Figures 6 and 7).

As described, the torsion devices have connection to the carriage, and connection to the support is achieved by link means including a pair of links 88 and 90 individually pivoted at their lower ends by pins 92 and 94 respectively to the arms 84 and 86 and pinned in common at their upper ends at 96 to a yoke 98 which has a vertically internally threaded portion 100. The rearwardly bent portion of the carriage front wall 48 is apertured at 102 to accommodate the yoke. A threaded adjusting member 104, having a shouldered head 106 above the top strap 32, penetrates the top strap and is threaded into the threaded portion 100 of the yoke to complete the linkage or connection of the resilient means 68—70 to the support 22. Thus, when weight is applied to the carriage, it may have downward movement, resisted by the torsion devices 68 and 70; that is to say, when the carriage moves down, the arms 84 and 86, being connected to the top of the support via the links 88 and 90, yoke 98, threaded member 104 and top strap 32, tend to turn upwardly from their Figure 5 positions, resisted by the resiliency of the rubber blocks 68 and 70. Adjustment of the threaded member 104 of course varies the positions of the arms and thus varies the load or bias in the rubber blocks and therefore affords an adjustment of the vertical spring rate of the carriage. Since the seat is connected to the carriage, as will be presently described, the adjustment varies the characteristics of the ride, giving soft or stiff or various intermediate rides as desired, according to the weight and individual desires of the operator.

The manner of mounting the seat as such on the carriage for vertical movement thereof with the carriage as well as for lateral swinging relative to the carriage involves upper and lower support means. The upper means comprises a fore-and-aft pivot means, here a bolt 108 passed through a central upper part of the seat back wall 62 and a central upper part of the carriage front wall 48, in which respect the front wall 48 is augmented by a U-shaped member 110 welded or otherwise rigidly secured thereto as best seen in Figures 5 and 7. The pivot axis thus provided is relatively high but is within the confines of the support 22, and thus suspends the seat as a pendulum swingable laterally relative to the carriage about said axis while mounting the seat for vertical movement with the carriage. Since the pivot just mentioned is relatively high, the moment created by the loaded seat is downwardly and forwardly and for this purpose the seat structure includes low-friction means for additionally sustaining the seat to combine with the pivot. This means includes a pair of laterally spaced apart lower rollers 112 carried by brackets 114 rigidly mounted on the carriage rear wall 46 by means of bolts 116 connected to the cross member 46 of the carriage. Pins 118 journal the rollers below the level of the pivot 108 and these pins are on axes that converge upwardly and centrally toward the axis of the pivot pin 108. Thus the lower part of the seat back wall bears against the rollers and stabilizes the seat for lateral swinging about the pivot 108.

The pivot just described enables the seat to automatically level itself as the tractor, for example, tilts laterally, as on a hillside or when one wheel is running in a furrow when plowing, and therefore the operator is in a comfortable upright position and need not lean to one side to retain his balance. In instances in which the side hill slopes vary not only in degree but from side to side, this feature is a decided advantage. In order that the rate of lateral swinging may be controlled or even stopped, there is provided selectively settable control means, here in the form of a cylinder 120 connected at 122 to the carriage and having a piston 124 connected at 126 to the seat back wall at a lower part thereof. When the seat is level while the tractor is level, the piston is in a substantially central position, and the cylinder contains oil or other suitable fluid at opposite sides of the piston. A conduit 128 (Figure 8) interconnects the opposite ends of the cylinder respectively at opposite sides of the piston and as the seat swings laterally about the pivot 108 the fluid is interchanged from one end of the cylinder to the other. The rate of lateral swinging of the seat may be controlled by regulating the rate of fluid interchange and this is accomplished by the provision of a conventional adjusting valve 130 in the conduit 128 (Figure 8). When the valve is wide open, the rate is high, and when closed the rate may be reduced to zero, thus locking the seat in any selected position against swinging. For example, the seat may be locked in a position of maximum swing to either side of its central position (dotted lines, Figure 3), or in a central position. Or the valve may be adjusted to make the seat more or less sensitive to tilting of the tractor, as will be clear from the foregoing.

The modified structure of Figures 9, 10 and 11 includes many of the components of the seat of Figures 1-8 and to the extent that similarity occurs the same reference numerals will be employed, except that the modified structure as a whole is denoted in its entirety at 20a. It nevertheless has a basic support 22 made up of the uprights 26 and cross member 28 which mounts a modified form of carriage 40a via upper and lower rollers 52 and 54 which run in the channel tracks 26 as before. The carriage carries the seat 56 via its back wall 62 on a fore-and-aft pivot 108a like that at 108, except that in the structure 20a, the pivot 108a is a rod or pin welded centrally to an upper cross shaft 52' which journals the upper rollers 52 and which is secured to upper portions of the carriage side members 42a.

The shaft 52' is shaped as shown so as to afford space for a single, central, compactly arranged torsion device or means 68a, here having a single rubber block or "doughnut" 70a carried by a fore-and-aft shaft 80a which is in turn supported by an inverted-U-shaped support or hanger 48a welded to the cross shaft 52'. The rubber block 70a affords a "spring" and has its front and rear faces bonded or otherwise secured to a pair of radial arms 84a and 86a which project in laterally opposite directions to free ends which respectively carry guide means, here rotatable sprockets 92a and 94a. The arms are shaped as shown so as to utilize the available space to the best advantage, which, on the whole, is a general feature of the design 20a, which differs from that at 20 primarily in the single central device 68a as distinguished from the two devices 68 and 70.

As a further exploitation of the above advantages, the suspension in the structure 20a uses motion-modifying means, including the sprockets 92a and 94a and chains or equivalent flexible members 88a and 90a which are trained respectively beneath the sprockets and which are anchored at their first ends to upper portions of the carriage at 89 and 91 and which are anchored at their second ends respectively to arms 93 and 95 of a suspension yoke or depending element 100a which, like that at 100, is vertically adjustably suspended from the cross member 28 by a screw 106. With this construction, as weight is applied to the seat, the arms 84a and 86a turn upwardly relative to each other as opposed by the torsion element or rubber block 70a but through a more desirable angular range than if these arms were connected directly to the arms 93 and 95. Specifically, because of space limitations in the adaptation of the structure to the tractor or similar machine and because of characteristic limitations on the mechanical capacity of rubber blocks such as that at 70a, a problem arises as to how to obtain the desired vertical deflection of the seat 56 within a certain angular range of twist of the block 70a. In the disclosed example, it is desired that the block twist be wept to around a maximum of 60° and it is found that vertical deflection of the seat should be in order of about 5"-6". If a wider structure could be tolerated, the arms 84a and 86a could be made longer. However, as indicated, space limitations prevent this. But, according to this phase of the invention, the motion-halving mechanism (chains, sprockets, etc.) produces a mechanical advantage that enables the accomplishment of the same result in a simple and economical manner and at the same time permits important improvements in reduced size, compactness and efficiency.

The lower part of the carriage 42a carries a cross shaft 54' on opposite ends of which the rollers 54 are journaled. The central part of the shaft is shaped as shown to accommodate certain parts of the tractor, as hitch components, etc. (not shown).

Means such as that discussed at 120—122—124—126 in the seat structure 20 is also present here and the above numerals are applied to the modified structure for orientation, it being understood that in this respect as well as in other readily recognized respects the two structures 20 and 20a are comparable, with the major exception residing in the suspension or torsion devices. In the structure 20a, the seat guide rollers are supported by brackets 114a which are welded to the front of the shaft 54' and which, as before, run against the lower part of the seat back wall 62.

As already outlined, the seat structure features the novel suspension, particularly as concerns the compactness of the design in which the suspension means is confined generally to the support and carriage, and thus, alone and/or in combination with the automatic leveling feature affords a seat having all the desirable characteristics of a proper seat design. Many of the constructional details disclosed here as based upon a presently preferred embodiment of the invention may be varied, and features and objects in addition to those outlined may be achieved without departure from the spirit and scope of the invention.

What is claimed is:

1. A seat structure for a tractor or like vehicle having a fore-and-aft body, comprising: a base frame having lower means for affixation to the body, a pair of laterally spaced apart upright channels facing inwardly toward each other and rising from the lower means to coterminous upper ends, and cross means spanning and secured to said upper ends, each channel affording closely spaced upright front and rear inner track surfaces; a box-like carriage of lesser height than the base frame and disposed between the channels and below the cross means and having opposite sides respectively proximate to the channels and further having front and rear wall means cross-connecting said opposite sides and lying generally within the fore-and-aft dimension of the channels; guiding and stabilizing means mounting the carriage on the base frame for relative vertical movement and including a pair of upper and a pair of lower track followers carried by upper and lower portions of the carriage respectively at said opposite sides and respectively received by the channels, each upper follower being arranged to bear against and run along only the front track surface of the respective channel and each lower follower being arranged to bear against and run along only the rear track surface of the respective channel; resilient suspension means located between the opposite sides and between the front and rear wall means of the carriage and having connections to the carriage and to the aforesaid cross means to suspend the carriage in an upper position and yieldable to enable downward movement of the carriage under weight applied thereto; a seat disposed ahead of the carriage and having a transverse back wall closely ahead of the carriage front wall means; fore-and-aft pivot means connecting a central upper part of the seat back wall to a central upper part of the carriage front wall means to mount the seat on the carriage for vertical movement with the carriage and to further mount the seat as a pendulum swingable laterally relative to the carriage; and low-friction means operative between a lower part of the seat and a lower part of the carriage to sustain the former on the latter for lateral swinging about the pivot means.

2. The invention defined in claim 1, including: selectively controllable means connected between the seat and the carriage for regulating the rate of lateral swinging of the seat.

3. The invention defined in claim 1, in which: the suspension means includes a first torsion device mounted on the carriage front wall means at one side of the median plane of said carriage; a second torsion device mounted on the carriage rear wall means at the other side of said median plane, the connection to the carriage includes first and second arms secured respectively to the torsion devices and extending transversely of the carriage, and the connection to the cross means includes suspension links connected between the cross means and said arms.

4. A seat structure for a tractor or like vehicle having a fore-and-aft body, comprising: a base frame having lower means for affixation to the body, a pair of laterally spaced apart upright track members rising from the lower means to coterminus upper ends, and cross means spanning and secured to said upper ends; a carriage of lesser height than the base frame and disposed between the track members and below the cross means and having opposite sides respectively proximate to the track members and further having transverse support means extending between said opposite sides; guiding and stabilizing means mounting the carriage on the track members for relative vertical movement and including a pair of upper and a pair of lower track followers carried by upper and lower portions of the carriage respectively at said opposite sides and respectively engaging the track members, each upper follower being arranged to bear only forwardly against and to run along the respective member and each lower follower being arranged to bear only rearwardly against and to run along the respective member; resilient suspension means having connections to the carriage and to the aforesaid cross means to suspend the carriage in an upper position and yieldable to enable downward movement of the carriage under weight applied thereto; a seat disposed ahead of the carriage and having a transverse back wall closely ahead of the carriage; fore-and-aft pivot means connecting a central upper part of the seat back wall to a central upper part of the carriage support means to mount the seat on the carriage for vertical movement with the carriage and to further mount the seat as a pendulum swingable laterally relative to the carriage; and low-friction means operative between a lower part of the seat and a lower part of the carriage to sustain the former on the latter for lateral swinging about the pivot means.

5. The invention defined in claim 4, including: selectively controllable means connected between the seat and the carriage for regulating the rate of lateral swinging of the seat.

6. The invention defined in claim 4, in which: the suspension means includes a first torsion device mounted on the carriage at one side of the median plane of said carriage, a second torsion device mounted on the carriage at the other side of said median plane, the connection to the carriage includes first and second arms secured respectively to the torsion devices and extending transversely of the carriage, and the connection to the cross means includes suspension links connected between the cross means and said arms.

7. A seat structure for a tractor or like vehicle having a fore-and-aft body, comprising: an upright support having lower means for affixation to the body and having an upper end; a carriage disposed closely adjacent to the support; track means mounting and guiding the carriage on the support for vertical movement; resilient suspension means between the support and the carriage for suspending the carriage in an upper position and yieldable to enable downward movement of the carriage relative to the support; a seat disposed ahead of the carriage and having a back proximate to said carriage and a rider-supporting portion secured to and projecting forwardly from a lower part of said back; and fore-and-aft pivot means connecting an upper central part of the seat back to an upper central part of the carriage to suspend the seat from the carriage as a pendulum so that said rider-supporting portion is swingable laterally relative to the carriage in an arc about said pivot means while the seat is movable vertically with the carriage.

8. The invention defined in claim 7, including: selectively controllable means connected between the seat and the carriage for regulating the rate of lateral swinging of the seat.

9. The invention defined in claim 8, in which: the controllable means includes a fluid device including a cylinder element and a piston element, one element being connected to the seat and the other element being connected to the carriage; a conduit interconnecting opposite ends of the cylinder at opposite sides of the piston, and a regulating valve in the conduit to control the rate of fluid flow through the conduit from one end of the cylinder to the other.

10. A seat structure for a tractor or like vehicle having a fore-and-aft body, comprising: an upright box-like support having opposite upright laterally spaced apart sides affording vertical track means; a carriage of box-like structure generally contained within the support and having at opposite sides thereof track follower means riding the track means to mount the carriage for relative vertical movement; resilient suspension means generally contained within and connected to the carriage and the support for suspending the carriage in an upper position and yieldable to enable downward movement of the carriage relative to the support; a seat disposed ahead of the carriage and having a back proximate to said carriage and a rider-supporting portion secured to and projecting forwardly from a lower part of said back; and fore-and-aft pivot means connecting an upper central part of the seat back to an upper central part of the carriage to suspend the seat as a pendulum so that said rider-supporting portion is swingable laterally relative to the carriage in an arc about said pivot means while said seat is movable vertically with the carriage.

11. A seat structure for a tractor or like vehicle having a fore-and-aft body, comprising: an upright support having lower means for affixation to the body and having a top; a carriage of lesser height than the support and disposed closely adjacent to the support; track means mounting and guiding the carriage on the support for vertical movement; resilient suspension means between the support and the carriage for suspending the carriage in an upper position adjacent to the top of the support and yieldable to enable downward movement of the carriage relative to the support; a seat disposed ahead of the carriage and having a seating surface at a relatively low level as respects the top of the support; fore-and-aft pivot means on an upper central part of the carriage above the level of the seating surface; and means depending from said pivot means to the seat to suspend the seat as a pendulum so that the seating surface is swingable laterally relative to the carriage in an arc about said pivot means while the seat is movable vertically with the carriage.

12. A seat structure for a tractor or like vehicle having a fore-and-aft body, comprising: an upright box-like support having a top and opposite upright laterally spaced apart sides affording vertical track means; a carriage of box-like structure generally contained within the support and having at opposite sides thereof track follower means riding the track means to mount the carriage for relative vertical movement; resilient suspension means generally contained within and connected to the carriage and the support for suspending the carriage in an upper position adjacent to the top of the support and yieldable to enable downward movement of the carriage relative to the support; a seat disposed ahead of the carriage and having a seating surface at a relatively low level as respects the top of the support; fore-and-aft pivot means on an upper central part of the carriage above the level of the seating surface; and means depending from said pivot means to the seat to suspend the seat as a pendulum swingable laterally relative to the carriage in an arc about said pivot means but movable vertically with the carriage.

13. A seat structure for a tractor or like vehicle having a fore-and-aft body, comprising: upright support means having a lower portion for affixation to the body, a top, and opposite laterally spaced apart upright sides; a carriage disposed within the top, sides and lower portion of the support means for vertical movement relative to said support means, said carriage having front and rear wall means affording a space therebetween; suspension means located in said space and including link means secured to the support means top and depending into said space and torsion means connected to the link means and to the carriage for suspending the carriage in an upper position from which said carriage is movable downwardly upon yielding of the torsion means; a seat mounted on the carriage forwardly thereof and forwardly of the support means for vertical movement with said carriage; and means cooperative between the carriage and the sides of the support means for guiding the carriage in its vertical movement.

14. A seat structure for a tractor or like vehicle having a fore-and-aft body, comprising: upright support means of relatively narrow fore-and-aft dimension having a lower portion for affixation to the body and further having a top; a carriage of similarly relatively narrow fore-and-aft dimension disposed closely proximate to the support means and normally below the top of the support means for vertical movement relative to said support means; suspension means confined generally within the fore-and-aft dimension of the support means and carriage and including link means secured to the support means top and depending into said space and torsion means connected to the link means and to the carriage for suspending the carriage in an upper position from which said carriage is movable downwardly upon yielding of the torsion means; a seat mounted on the carriage forwardly thereof and forwardly of the support means for vertical movement with said carriage; and means cooperative between the carriage and the sides of the support means for guiding the carriage in its vertical movement.

15. A seat structure for a tractor or like vehicle having a fore-and-aft body, comprising: an upright transverse support element having lower means for affixation to the body; a seat ahead of the support and having an upright seat back element closely paralleling the support element; fore-and-aft pivot means connecting an upper central part of the seat back element to an upper central part of the support element to suspend the seat as a pendulum for lateral swinging relative to the support element in an arc about said pivot means; and roller means disposed below the pivot means and carried by one element and engaging the other element to guide said seat in its lateral swinging and operative to absorb rearward thrust applied to said seat by a rider thereon.

16. The invention defined in claim 15, in which: the roller means includes a pair of laterally spaced apart rollers mounted respectively on axes disposed in an upright transverse plane and converging upwardly toward the pivot means.

17. A seat structure for a tractor or like vehicle having a fore-and-aft body, comprising: an upright transverse support element having lower means for affixation to the body; a seat ahead of the support and having an upright seat back element closely paralleling the support element; fore-and-aft pivot means connecting an upper central part of the seat back element to an upper central part of the support element to suspend the seat as a pendulum for lateral swinging relative to the support element in an arc about said pivot means; and guide means disposed below the pivot means and carried by one element and engaging the other element to guide said seat in its lateral swinging and operative to absorb rearward thrust applied to said seat by a rider thereon.

18. The invention defined in claim 4, in which: the suspension means includes a torsion device carried by the carriage centrally between the upright channels; a pair of arms secured to said device and projecting laterally oppositely toward said channels for relative vertical movement as yieldably opposed by said device, each arm having guide means at its free end; a suspension element depending from the cross means above said suspension means and having anchor means thereon; and a pair of flexible members connected to the anchor means and extending downwardly and respectively under the guide means on the arms and thence upwardly to connections with the carriage.

19. A seat structure for a tractor or like vehicle having a fore-and-aft body, comprising: a base frame having lower means for affixation to the body, a pair of laterally spaced apart upright track members rising from the lower means to coterminous upper ends, and cross means spanning and secured to said upper ends; a carriage of lesser height than the base frame and disposed between the track members and below the cross means and having opposite sides respectively proximate to the track members and further having transverse support means extending between said opposite sides; guiding and stabilizing means mounting the carriage on the track members for relative vertical movement and including a pair of upper and a pair of lower track followers carried by upper and lower portions of the carriage respectively at said opposite sides and respectively engaging the track members, each upper follower being arranged to bear only forwardly against and to run along the respective member and each lower follower being arranged to bear only rearwardly against and to run along the respective member; resilient suspension means having connections to the carriage and to the aforesaid cross means to suspend the carriage in an upper position and yieldable to enable downward movement of the carriage under weight applied thereto; a seat disposed ahead of the carriage; and means connecting the seat to the carriage for vertical movement with the carriage; the suspension means including a torsion device carried by the carriage centrally of the support; a pair of arms secured to said device and projecting laterally oppositely for relative vertical movement as yieldably opposed by said device, each arm having guide means at its free end; a suspension element depending from the upper portion of the support above said suspension means; and a pair of flexible members connected to the suspension element and extending downwardly and respectively under the guide means on the arms and thence upwardly to connections with the carriage.

20. The invention defined in claim 7, in which: the suspension means includes a torsion device carried by the carriage centrally of the support; a pair of arms secured to said device and projecting laterally oppositely for relative vertical movement as yieldably opposed by said device, each arm having guide means at its free end; a suspension element depending from an upper portion of the support above said suspension means; and a pair of flexible members connected to the suspension element and extending downwardly and respectively under the guide means on the arms and thence upwardly to connections with the carriage.

21. A seat structure for a tractor or like vehicle having a fore-and-aft body, comprising: an upright support having means for affixation to the body and including an upper portion spaced above the body; a carriage closely adjacent to the support and having a connecting part below said support upper portion; a seat carried by the carriage; means mounting and guiding the carriage on the support for relative vehicle movement; and resilient suspension means between the support and carriage for suspending the carriage and seat in an upper position and yieldable to enable downward movement of the carriage and seat, said suspension means including a torsion device carried by the carriage; a pair of arms secured to said device and projecting laterally oppositely for relative vertical movement as yieldably opposed by said device, each arm having guide means at its free end; a suspension element depending from the support upper portion cross means above said suspension means and having anchor means thereon; and a pair of flexible members connected to the anchor means and extending downwardly and respectively under the guide means on the arms and thence upwardly to connections with the carriage.

22. A seat structure for a tractor or like vehicle having a fore-and-aft body, comprising: an upright support having means for affixation to the body and including an upper portion spaced above the body; a carriage closely adjacent to the support and having a connecting part below said support upper portion; a seat carried by the carriage; means mounting and guiding the carriage on the support for relative vertical movement; and resilient suspension means between the support and carriage for suspending the carriage and seat in an upper position and yieldable to enable downward movement of the carriage and seat, said suspension means including a first torsion device mounted on the carriage at one side of the median plane of said carriage, a second torsion device mounted on the carriage at the other side of said median plane, first and second arms secured respectively to the torsion devices and extending transversely of the carriage, and suspension links connected between the support upper portion and said arms.

23. The invention defined in claim 7, including: means between a lower part of the seat and the carriage for guiding the seat during lateral swinging thereof and operative to absorb rearward thrust applied to the seat by a rider thereon.

24. The invention defined in claim 23, in which: said last-named means includes a pair of rollers journaled respectively on axes that converge upwardly and intersect the fore-and-aft pivot means.

References Cited in the file of this patent

UNITED STATES PATENTS

| | | |
|---|---|---|
| 357,059 | Banks | Feb. 1, 1887 |
| 446,659 | Bunker | Feb. 17, 1891 |
| 2,573,077 | White | Oct. 30, 1951 |
| 2,682,295 | Hickman | June 29, 1954 |
| 2,715,938 | Miller | Aug. 23, 1955 |
| 2,859,063 | Underland | Nov. 4, 1958 |